United States Patent [19]

Behunin

[11] Patent Number: 4,775,322

[45] Date of Patent: Oct. 4, 1988

[54] CYCLIC STEREOPHONIC SOUND PATTERN METHOD AND APPARATUS FOR READING IMPROVEMENT

[76] Inventor: Stephen O. Behunin, 1318 Yuma St., Salt Lake City, Utah 84108

[21] Appl. No.: 928,023

[22] Filed: Nov. 7, 1986

[51] Int. Cl.⁴ ............................................. G09B 17/04
[52] U.S. Cl. .................................................. 434/179
[58] Field of Search ............... 434/178, 179, 181, 182, 434/236, 319

[56] References Cited

U.S. PATENT DOCUMENTS

| | | | |
|---|---|---|---|
| 2,110,344 | 3/1938 | Taylor et al. | 434/179 |
| 3,332,076 | 7/1967 | Burson | 434/179 |
| 3,594,919 | 7/1971 | DeBell et al. | 434/319 |
| 3,982,332 | 9/1976 | Szymczak | 434/181 |
| 4,189,852 | 2/1980 | Chatlien | 434/319 |

*Primary Examiner*—Charles T. Jordan
*Assistant Examiner*—Richard Klein
*Attorney, Agent, or Firm*—Jon C. Christiansen

[57] ABSTRACT

A reading method for reading text whereby the reader listens to a cyclic stereophonic sound pattern while reading the text. The cyclic stereophonic sound pattern paces the reader's eye movement over the text. The invention also includes reading improvement apparatus used in the practice of this method.

17 Claims, 1 Drawing Sheet

CYCLIC STEREOPHONIC SOUND PATTERN METHOD AND APPARATUS FOR READING IMPROVEMENT

INTRODUCTION

This invention relates to both method and apparatus for the improvement of reading skills. The invention helps to establish correct eye movement over textual materials and paces such eye movement to increase reading speed. The invention also improves reading comprehension and retention.

The objectives of the invention are as follows:

(1) Pacing to increase the speed at which the reader reads textual materials by pacing the reader's eye movement. The typical reader tends to vocalize each word that is read. Often such vocalization is a silent subconscious vocalization of each word. The typical reader's mind is able to process words at a rate much greater than the rate at which he/she normally reads words vocally.

(2) Optimum Eye Movement

To train and assist the reader in establishing eye movement which scans the textual material in the optimum pattern and minimizes the number of saccadic eye movements and eye fixations.

(3) Concentration

To improve the reader's ability to concentrate his/her senses on the task of reading. When concentration is improved, the reader's comprehension and retention are improved. When any of the reader's senses "wanders" or is distracted from the task of reading, his/her concentration is reduced. This invention trains and assists the reader in blocking out sounds that distract the sense of hearing and in focusing the sense of sight on the textual materials being read.

The above-identified objectives as well as other objectives, aspects and advantages of the invention will be clear to a person of ordinary skill in the art upon a study of this disclosure, including the appended claims.

SUMMARY OF INVENTION

The reading method of this invention is practiced by a reader by listening to a cyclic stereophonic sound pattern while reading text. The cyclic stereophonic sound pattern is created by panning a sound source. The cyclic stereophonic sound pattern paces the reader's eye movement over the text. Reading improvement apparatus for the practice of this method is comprised of a cyclic stereophonic sound pattern and a listening means for the reader to listen to the cyclic stereophonic sound pattern.

The reading improvement apparatus of this invention can be a cyclic stereophonic sound pattern recorded in a medium from which the sound pattern can be heard by the reader of text either directly or with the aid of a machine. For example, the cyclic stereophonic sound pattern can be recorded in an audio tape which the reader listens to through the use of an audio tape player. Alternatively, the sound pattern can be synthesized at the time the reader listens to the sound pattern through the use of a synthesizing sound system. The means which allows the reader to listen to the cyclic stereophonic sound pattern can be any conventional means (such as an audio tape and audio tape player or a conventional synthesizer) known today or can be any means developed in the future which can accomplish such purpose.

The effectiveness of the invention is enhanced by use of stenopaic goggles which are a blind having stenopaic slits at the reader's eye level.

DETAILED DESCRIPTION

Figure 1:
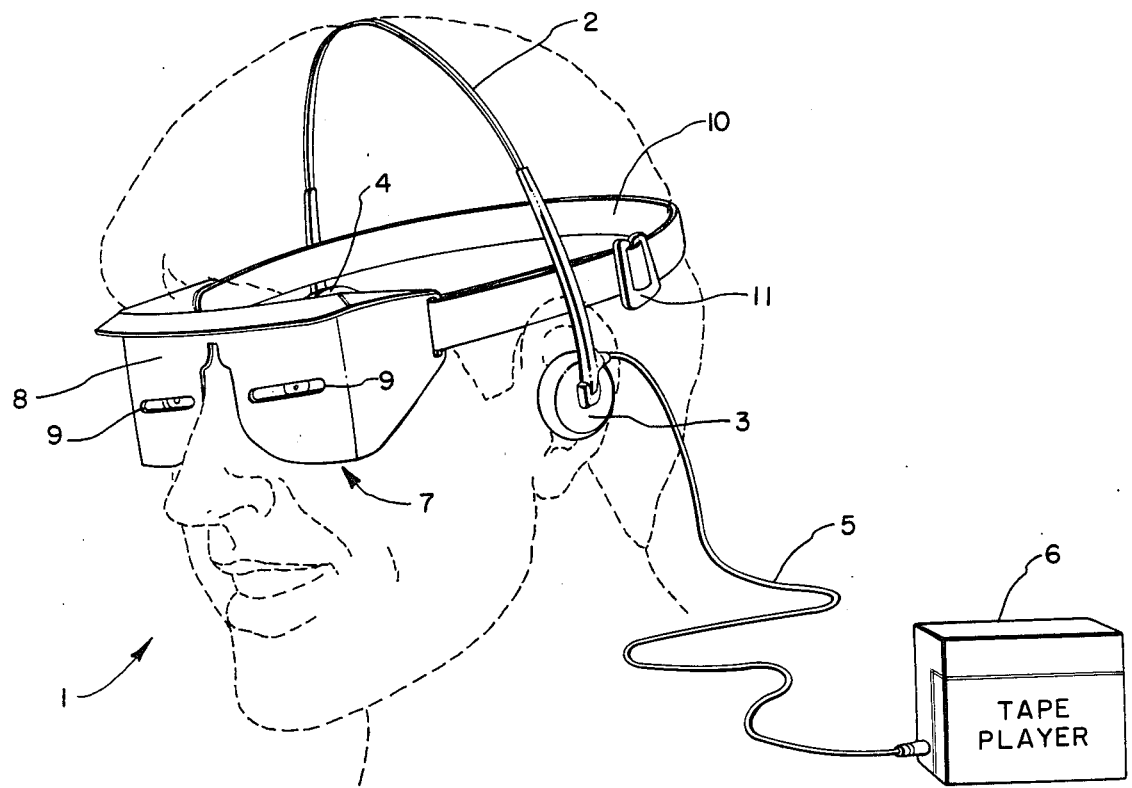
FIG. 1 depicts a reader listening to a cyclic stereophonic sound pattern through a headphone set. The reader is also depicted wearing stenopaic goggles.

The method of this invention involves listening to a cyclic stereophonic sound pattern while reading text. As used in this disclosure (including the appended claims), text means the printed or written words or other visual symbols which are read by the reader. The cyclic stereophonic sound pattern is an auditory pattern created by panning a sound source as described below. The cyclic stereophonic sound pattern can be constructed from any basic sonic texture, (e.g. ocean waves, wind, tones, vocal harmonies or other sounds) or a combination of sonic textures. There is no "best mode" sonic texture as any choice thereof is a matter of preference to be decided by the reader (i.e. the listener). The inventor personally prefers ocean sounds and vocal harmonies. The cyclic stereophonic sound pattern provides a cyclic auditory pattern of left to right and then right to left which the eyes can follow visually by scanning the text left to right and then right to left. A single auditory cycle is left to right then right to left. (Note: an equivalent cycle is right to left then left to right and such equivalent cycle is intended to be encompassed within the scope of the appended claims). Because the sound pattern is cyclic, the "left to right then right to left" auditory cycle is repeated continually over the period of time that the invention is in use. The cycle can be repeated using the same or different sound patterns (i.e. sound patterns constructed from different or varying sonic textures).

Panning is used to create the cyclic stereophonic sound patterns of this invention. The process and technology of panning is known to persons of ordinary skill in the relevant art. Panning is commonly accomplished by using a complimentary pair of potentiometers connected to a common source and arranged to supply an attenuated signal on one side and a normal signal on the other side. The potentiometers share a common shaft which when rotated causes the above situations (i.e. attenuated signal and normal signal) to be exchanged one for the other in a smoothly varying fashion. The taper of the potentiometers is so arranged that as the shaft is rotated from one extreme position to the other (e.g. left to right) the sound moves from one of the loudspeakers to the other (e.g. left to right) in a manner which closely corresponds to the position of the shaft. Thus, when the shaft is turned to the center position, the sound appears to be located halfway between the two loudspeakers. The effect is similar when using headphones as the loudspeakers. Headphones are preferred in the practice of this invention.

By turning the shaft one way and then the other the sonic texture is moved across an approximately horizontal auditory trajectory which corresponds to the horizontal length of a typical line of printed text as viewed during the reading process. The cyclic stereophonic sound pattern is created by panning the sound source from left to right and then right to left (i.e. from one extreme to the other extreme and then back to the first extreme) to create the auditory cycle. Initially, the reader consciously causes his/her eye movement to be paced by the cyclic stereophonic sound pattern. With time and practice, the reader's eye movement becomes subconsciously paced by the cyclic stereophonic pattern. The sound pattern induces the eyes to move with it and thus produces the regular patterns of eye motion which are associated with the discipline of rapid reading. This induced motion is a form of synesthesia.

The panning effect described above can also be brought about by causing the sound presented to one loudspeaker or earpiece to be delayed relative to the other. The listener then hears the sound on the opposite side of center from the delayed site. The displacement from center is increased as the delay is increased. A combination of attenuation and delay can be used to produce motion of the sonic texture away from the side to which they are applied. In addition, it is also possible to cause such motion by the judicious use of equalization. Since attenuation and delay are relative terms, it is obvious that amplification and advance can be used to produce the same results. The same applies to equalization.

The apparatus used in the practice of this invention is any device or machine capable of allowing the reader to listen to a cyclic stereophonic sound pattern while he/she is reading. Such devices can use any of a broad variety of methods to produce the cyclic stereophonic sound pattern. Examples include: pre-recorded sound tapes and tape player, electronc synthesizers and processors, digital memories and processors, etc. all of which can be used individually or in combination and can be controlled by suitable knobs, switches, etc. to operate at various rates, with differing sound textures, using wider or narrower scan widths, etc. A person of ordinary skill in the art, after a study of this disclosure, will be able to practice the invention by using conventional technology to create and listen to cyclic stereophonic sound patterns. The cyclic stereophonic sound pattern can be listened to "live" as it is being created or it can be recorded in a medium (such as an audio tape) and be listened to on a delayed basis. The cyclic stereophonic sound pattern can be listened to with more than two speakers. For example, a quadraphonic arrangement can be used and is within the scope of the appended claims. Also, the invention can be adapted to, and/or used in combination with, a computer (preferably a microcomputer) system. A computer system with music or audio capability can serve as the source of the sound pattern and the computer monitor (screen) can provide the text.

FIG. 1 depicts a reader 1 employing an embodiment of the invention. Headphone set 2 provides left speaker 3 and right speaker 4. Headphone set 2 is connected by line 5 to an audio tape player 6 (alternatively, the sound source can be in and part of the headphone set). Tape player 6 is playing an audio tape in which a cyclic stereophonic sound pattern is recorded. Reader 1 listens to the cyclic stereophonic sound pattern through left speaker 3 and right speaker 4. The cyclic stereophonic sound pattern has been created by panning a sound source from left to right then right to left, so the auditory cycle heard by the reader goes from left ear to right ear and then from right ear to left ear. This "left to right then right to left" auditory cycle is repeated continuously for so long as the reader listens to the audio tape.

As reader 1 reads his text, his eye movement is paced by the cyclic stereophonic sound pattern. As the sound goes from left to right, the reader's eyes move from left to right along the first line of text. As the sound goes from right to left, the reader's eyes move from right to left across the second line of text. With the next auditory cycle, the reader's eyes move from left to right across the second line of text (as the sound goes from left to right) and move from right to left across the third line of text (as the sound goes from right to left). The reading process and the auditory cycles continue in a similar manner. The speed of the cyclic stereophonic sound pattern (i.e. auditory cycles per minute or c.p.m.) sets the pace at which the reader reads the text. The speed of the cyclic stereophonic sound pattern paces the reader at a pace which prevents the vocalizing of words from interferring with a rapid reading process. Thus, the reader reads at an increased speed or rate. As the reader improves, the speed of the cyclic stereophonic sound pattern can be increased (i.e. auditory cycles per minute can be increased). Generally, the reader should begin at about 20 to 40 c.p.m. and work from there up to 100 or 120 c.p.m. Of course, the reader is not limited to the foregoing speeds and can use faster (or slower) speeds depending upon the preferences and abilities of the individual reader.

As the reader's skills develop or if the reader desires to skim the text, the reader can "take in" more than a single line of text with each forward half cycle (i.e. the left to right half cycle). Some readers can even develop an ability to comprehend text "taken in" during the return half cycle (i.e. the right to left half cycle). Some readers may desire to skip lines when skimming the text.

The cyclic stereophonic sound pattern trains and assists the reader in establishing eye movement which scans the text in the optimum pattern and minimizes the number of saccadic eye movements and eye fixations. The cyclic stereophonic sound pattern also improves the ability of the reader to concentrate by blocking out auditory distractions.

When creating the cyclic stereophonic sound pattern by panning the sound source, the sound source can be panned with volume adjustments to add another dimension to the invention. For example, the sound source can be panned as follows:

(a) the sound source is panned from left to right (the forward half cycle);

(b) the volume of the sound source is decreased;

(c) the sound source is panned from right to left (the return half cycle); and (d) the volume of the sound source is increased. In the minds of many readers such volume adjustments create an auditory impression which is visually described as an ellipse or helix. Eye movement corresponding thereto moves cyclically left to right then right to left across and down a page of text in an eliptical or helixical pattern. Such patterns facilitate very rapid reading of the text.

It should be noted that other volume adjustment patterns can be used. For example, the volume can be increased in step (b) and decreased in step (d).

It is also noted that, although the invention can be used on a continuing basis, it is also contemplated that the invention will train and assist the reader in establishing the above-described reading techniques and procedures sufficiently to improve the reader's reading performance when reading without the assistance or use of the inventive apparatus.

Figure 2:
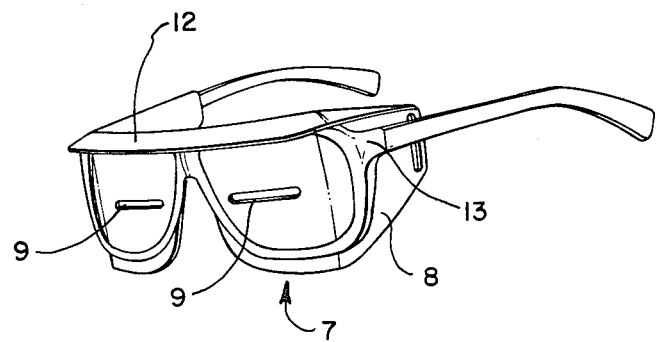
FIG. 2 depicts stenopaic goggles positioned on a pair of eye glasses.

FIG. 1 also shows stenopaic goggles 7 being worn by reader 1. The stenopaic goggles are blind 8 having stenopaic slits 9. The reader reads his text through stenopaic slits 9. Blind 8 functions to block visual distractions to the reader's sense of sight. Thus the stenopaic goggles help the reader to focus and concentrate on the task of reading. The stenopaic goggles 7 are secured to the reader's head at the appropriate eye level by an adjustable strap 10 having a conventional strap adjustment means 11. If the reader wears eye glasses, the stenopaic goggles 7 can be positioned on, and held in place by, the eye glasses shown in FIG. 2. The goggles 7 include a fold 12 which contacts the upper portion of eye glasses 13.

The foregoing description of this invention so fully reveals the general nature of this invention that others can, by applying current knowledge, readily modify such description and/or adapt it for various applications without departing from the generic concept, and therefore, such adaptations and modifications should and are intended to be comprehended within the meaning and range of equivalents of the following claims, which claims define subject matter regarded to be our invention.

I claim:

1. A reading method to be employed by a reader comprising listening to a cyclic stereophonic sound pattern while reading text; wherein said cyclic stereophonic sound pattern has been created by panning a sound source from left to right and from right to left to create a cyclic stereophonic sound pattern comprised of a "left to right then right to left" auditory cycle; and wherein said cyclic stereophonic sound pattern paces said reader's eye movement over said text in a "left to right then right to left" manner.

2. A reading method in accordance with claim 1 wherein said sound pattern is listened to by said reader with a left speaker and a right speaker.

3. A reading method in accordance with claim 2 wherein said sound source has been panned with volume adjustments as follows:
    (a) said sound source is panned from left to right;
    (b) the volume of said sound source is decreased;
    (c) said sound source is panned from right to left; and
    (d) the volume of said sound source is increased.

4. A reading method in accordance with claim 2 wherein said sound source has been panned with volume adjustments as follows:
    (a) said sound source is panned from left to right;
    (b) the volume of said sound source is increased;
    (c) said sound source is panned from right to left; and
    (d) the volume of said sound source is decreased.

5. A reading method in accordance with claim 2 wherein said left speaker and said right speaker are part of headphone set adapted to be worn by said reader.

6. A reading method in accordance with claim 1 wherein said reader reads said text is read through stenopaic slits in stenopaic goggles worn by said reader; wherein said stenopaic goggles comprise a blind having stenopaic slits through which said text can be read by said reader; and wherein said blind functions to block visual distractions to said reader's sense of sight.

7. A reading method in accordance with claim 1 wherein a computer system with music or audio capability serves as a source of said sound pattern.

8. Reading improvement apparatus to be used by a reader of text comprising a cyclic stereophonic sound pattern and a listening means for the reader to listen to said cyclic stereophonic sound pattern; wherein said cyclic stereophonic sound pattern has been created by panning a sound source; wherein said cyclic stereophonic sound pattern is comprised of a "left to right then right to left" auditory cycle; and wherein said sound pattern is adapted to pace eye movement over said text in a "left to right then right to left" manner.

9. Reading improvement apparatus in accordance with claim 8 wherein said listening means is comprised of a pre-recorded tape, a tape player, a left speaker and a right speaker; and wherein said sound pattern is recorded on said pre-recorded tape and can be listened to by the reader through said speakers.

10. Reading improvement apparatus in accordance with claim 8 wherein said listening means is comprised of a left speaker and a right speaker.

11. Reading improvement apparatus in accordance with claim 10 wherein said left speaker and said right speaker are part of a headphone set.

12. Reading improvement apparatus in accordance with claim 8 wherein said sound source is panned with volume adjustments.

13. Reading improvement apparatus in accordance with claim 8 further comprising stenopaic goggles adapted to be worn by said reader; wherein said stenopaic goggles comprise a blind having stenopaic slits through which said text can be read by said reader; and wherein said blind functions to block visual distractions to said reader's sense of sight.

14. Reading improvement apparatus comprising a cyclic stereophonic sound pattern recorded in a medium from which said sound pattern can be listened to by a reader of text either directly or with the aid of a machine; wherein said cyclic stereophonic sound pattern has been created by panning a sound source; wherein said cyclic stereophonic sound pattern is comprised of a "left to right then right to left" auditory cycle which is repeated when listened to by said reader; and wherein said cyclic stereophonic sound pattern is adapted to pace said reader's eye movement over said text.

15. Reading improvement apparatus in accordance with claim 14 wherein said sound pattern is heard with the aid of a machine; and wherein said medium is an audio tape and said machine is an audio tape player.

16. Reading improvement apparatus in accordance with claim 14 wherein said sound source has been panned with volume adjustments as follows:
    (a) said sound source is panned from left to right;
    (b) the volume of said sound source is decreased;
    (c) said sound source is panned from right to left; and
    (d) the volume of said sound source is increased.

17. Reading apparatus in accordance wtih claim 14 wherein said sound source has been panned with volume adjustments as follows:
    (a) said sound source is panned from left to right;
    (b) the volume of said sound source is decreased;
    (c) said sound source is panned from right to left; and
    (d) the volume of said sound source is increased

* * * * *